United States Patent [19]

Brackett

[11] Patent Number: 5,415,130
[45] Date of Patent: May 16, 1995

[54] SPRINKLER FOR WASHING THE UDDERS OF DAIRY ANIMALS

[76] Inventor: Alan C. Brackett, c/o Hawthorne Screw Machine, 12355 Quicksilver Dr., Rancho Cordova, Calif. 95742

[21] Appl. No.: 181,416
[22] Filed: Jan. 14, 1994
[51] Int. Cl.⁶ .................. B05B 3/02; B05B 15/10; A01K 29/00
[52] U.S. Cl. .................... 119/159; 239/206; 239/204
[58] Field of Search .............. 119/159, 158, 83, 14.03, 119/85, 14.01; 239/204, 206, 251, 242, 240

[56] References Cited
U.S. PATENT DOCUMENTS

| | | | |
|---|---|---|---|
| 1,970,126 | 8/1934 | Buckner . | |
| 3,117,724 | 1/1964 | Ray | 239/206 |
| 3,554,166 | 1/1971 | Belden | 119/159 |
| 3,648,696 | 3/1972 | Keith | 119/159 |
| 4,625,914 | 12/1986 | Sexton et al. | 239/206 |
| 4,699,321 | 10/1987 | Givens et al. | 239/204 |
| 4,867,378 | 9/1989 | Kah | 239/206 |
| 4,903,639 | 2/1990 | Kessel | 119/159 |
| 5,048,757 | 9/1991 | Van Leeuwen | 239/206 |

*Primary Examiner*—John G. Weiss

[57] ABSTRACT

A sprinkler head comprising a strong, rigid body with removable top cap and having a smooth exterior surface absent flanges and sharp corners which might injure a cow. The body bottom includes an opening and threads for attaching a liquid supply pipe. Inside the body is a replaceable protective liner cup containing a rotary drive motor for rotating a movable nozzle having non-extending spray orifices at an upper side end. During operation, the nozzle is moved upward through a close-fit opening in the top cap by liquid pressure. The nozzle is also smooth, and is arranged to be able to be pressed downward during operation to reduce injuries, and to provide a self-cleaning action. The self-cleaning is enhanced by vibrations from the drive motor and the position of the orifices relative the top cap. The drive motor which rotates the nozzle, preferably includes replaceable parts at wear points. The top cap allows for convenient servicing of all parts subject to wear, while maintaining the interior of the body free of falling debris. The body, nozzle and drive motor are rendered highly durable by maintaining a separation between metal parts using self-lubricating plastics parts between each metal part. The multi-diameter spray orifices are structured to break-up the liquid into large individual droplets so the spray is gentle and more effective at cleaning a cow's udder with a reduced volume of liquid.

11 Claims, 5 Drawing Sheets

SPRINKLER FOR WASHING THE UDDERS OF DAIRY ANIMALS

BACKGROUND OF THE INVENTION

1. Field of the Invention

This invention relates to rotary sprinkler heads or liquid spraying nozzles affixed in a wash pen for washing udders and teats of dairy animals such as cows and the like prior to milking.

2. Description of the Prior Art

Although there are somewhat similarly structured and functioning sprinkler heads in the prior art compared to the present invention, which is an improved rotary sprinkler head, in the prior art there exists a major durability problem with stationary or affixed-in-place sprinkler heads or spray nozzles used for washing the udders and teats of dairy cows in commercial dairy operations. Most, if not all, sprinkler heads currently used in wash pens are actually designed and manufactured for use as lawn and landscape sprinklers, as opposed to the substantially different and harsher environment of a wash pen of a commercial dairy. A sprinkler head used for washing cow udders in a commercial dairy operation receives many times the use and abuse in a one year period as does a lawn or landscape sprinkler under its designed use. A lawn or landscape sprinkler may last for many years under normal use on a lawn or landscape, only being used for a few hours every couple of days during the dry months of the year. That same lawn sprinkler when used in a commercial dairy which milks the cows two or three times a day, seven days a week, will normally wear to a point of malfunctioning in substantially less than a year. Additionally, sprinkler heads used in wash pens are exposed to agents such as cow manure and urine which are highly corrosive, and this is not the normal environment for lawn and landscape sprinklers. When a rotary sprinkler head becomes significantly corroded or worn, it first begins to malfunction in terms of improperly rotating or in the improper spraying of cleaning solution (water) in the desired direction and in the proper volume, pressure and spray pattern. When a sprinkler malfunctions in a wash pen, it may go unnoticed for a period of time, leading to wasted costly water, and to improperly cleansed udders and teats. The malfunctioning sprinkler will require time to service, and possibly new parts to be installed therein, or a complete replacement thereof, all of which leads to increased operating cost.

Another problem existing in prior art sprinkler heads used for washing udders, is the exterior shape of the sprinkler heads. Wash pen sprinkler heads are normally mounted near the floor, typically between four and ten inches high, and supported by rigid water supply pipes (risers). Normally rows of multiple sprinkler heads are defined, with a row on each opposite side of a path along which the cows walk during the udder and teat washing process, wherein the sprinklers spray the udder from varying directions. Although most dairy cows are fairly cooperative for the process of cleaning and milking, they sometimes kick, and on occasion they trip and fall on sprinklers. When the sprinkler head is shaped with relatively sharp corners and or extending flanges, which is very common in the prior art, and a cow falls on it or kicks it, the sprinkler head can easily cut or otherwise injure the cow. Injuries in dairy cows can lead to a decrease in milk production and to costly medical treatments, both of which are undesirable. Additionally, cows can badly damage sprinkle heads with a single direct kick which delivers all of the impact to the sprinkler, and sharp corners and flanges are not conducive to deflecting the kick, but rather, typically result in all of the kick impact being directly and fully delivered to the sprinkler with the end result being the sprinkler head being damaged or destroyed, and the cow possibly being injured.

Another problem existing in prior art sprinkler heads used for washing udders, is the tendency to clog up in the spray nozzle orifice or to stop rotating. Since normally the sprinkler heads are mounted in close proximity to the cows, and quite low so that the majority of water shoots upward at an angle and strikes the cows in the area of the udder, it is not uncommon for cow manure or falling mud to land on top of a sprinkler head and nozzle, and this causes the majority of prior art sprinkler heads to cease proper functioning immediately, or to continue to function until such time the sprinkler is shut down at the end of the washing cycle, at which time the manure or mud drys and hardens to render the sprinkler inoperable at the beginning of the next wash cycle, usually eight to twelve hours later.

Another problem existing in prior art sprinkler heads used for washing udders, is the delivery of the washing solution in an excessively hard tight stream. High impact tight or solid streams cause a great deal of splashing, and are believed somewhat painful to the cow's udder. Cows do not like water splashed in their face, and consequently, hard tight streams of water which lead to upward splashing into the cow's face causes stress. This stress, and the discomfort of a hard tight stream against the udder leads to the cows becoming less willing to cooperate; to increases in milk let-down time in the milking parlor; to decreased milk production; and to an increase in injurious and damaging kicks in the wash pen, all being undesirable.

A further problem associated with prior art sprinkler heads for washing cow udders, is in the volume of water used, and in the amount of time it takes to properly clean each cow's udder. Water is seldom free of charge, and the more water used per cow, the higher the overall cost, and so it is clearly desirable to achieve properly clean udders and teats as quickly as is possible and with the lowest volume of water being used per cow.

An even further problem associated with prior art sprinkler heads used for washing cow udders, is in the structuring being such that with certain forms of wear in particular areas of the head, such as the sprinkler body for example, there are inadequate provisions for cost effectively repairing the damage; short of replacing the entire sprinkler head or a major and expensive component thereof.

Certainly all prior art sprinkler heads do not have all of the hereinabove mentioned shortcomings associated therewith, however all of them do have one or more of the above serious problems, and most have many of the problems. Therefore, there does exist a significant need for an improved sprinkler head or spray nozzle specifically for use in wash pens of commercial dairies, which overcomes all of the existing shortcomings of the prior art in a single improved sprinkler head.

Of the prior art sprinkler heads of which I am aware, the single most similar head to the present invention is taught in U.S. Pat. No. 1,970,126 issued Aug. 14, 1934 to W. A. Buckner for "Rotary Cam Drive Sprinkler". The Buckner sprinkler head, however, exemplifies many of the hereinabove described shortcomings which become most evident when the Buckner head is used in a commercial wash pen for cleaning udders and teats, as opposed to being used in its designed environment, which is lawns and landscapes. The Buckner head includes flanges injurious to cows, and also rendering the head exposed for destruction with a single kick from a cow. The Buckner sprinkler head is subject to quickly wearing-out with the extensive use associated with commercial dairies, as there are few if any protective structures associated with the relatively expensive components of his sprinkler. Additionally, the Buckner sprinkler includes a generally wide-open body top rendering the head subject to possible instant inoperability upon mud or manure falling therein and lodging against the rotary nozzle within the open cup-like body. The Buckner sprinkler head further includes insufficient attention to being able to quickly and very inexpensively replace parts which are naturally and unavoidably subjected to wear under normal operating conditions. The laterally extending Buckner stem-like nozzle orifices being designed for lawn and landscape watering, output an excessively hard tight stream which is not ideal for use in the washing of cow udders, as it splashes and is painful to the cows, and inefficient at quickly washing, being designed for irrigating not washing, and therefore it adds time to the washing process and thus uses high volumes of water per cow wash.

Although the Buckner sprinkler head exemplifies many major prior art shortcomings in its structure, rendering it a less than ideal commercial wash pen sprinkler head, it does include several structural arrangements which are nearly identical to those used in the present invention, and therefore the Buckner disclosure of U.S. Pat. No. 1,970,126 is herein incorporated by reference for both essential and nonessential material. One structure which is common in the Buckner sprinkler head and the present invention, is the rotary cam drive or drive motor. The present invention being a sprinkler head specifically structured for the environment and demands of a commercial dairy wash pen, uses a rotary cam drive motor which is structured nearly identical to that of Buckner's, and is essentially identical in operation and theory for rotating the nozzle and thus orifices of the sprinkler. Another common structural arrangement between the Buckner sprinkler and the present sprinkler is that the rotary cam drive motor is retained within and at the bottom end of a hollow outer body with a vertically movable nozzle extending vertically upward through the center of the body to position the orifices above the top of the body during operation, and retracting the orifices to reside essentially within the body when the sprinkler is not in use. The bottom of the Buckner body, like that of the present invention, also includes a threaded opening for threadably engaging and supporting the sprinkler head on a rigid liquid supply pipe wherein the liquid is brought into the bottom interior of the body to drive the immediately adjacent rotary cam drive motor responsible for rotating the nozzle, and the liquid brought into the bottom interior of the body is also arranged to vertically raise the nozzle and thus orifices to an operable and raised position above the top of the sprinkler body. The Buckner body is however substantially different in several important ways from the sprinkler body of the present invention. Therefore, because of the hereinabove specified commonalities between the Buckner sprinkler and the present sprinkler, as well as other possible commonalities not specifically described, and for the sake of briefness of this disclosure, the Buckner patent has been herein incorporated by reference.

SUMMARY

The present invention is an improved rotary sprinkler head specifically structured for use in an udder wash pen of a dairy. My sprinkler head includes a corrosion resistant, strong outer body having a rounded, smooth exterior surface to reduce tripping and injuries to cows. The smooth body having rounded corners and no extending flanges also causes most, if not all, kicks delivered thereto to glance off or to be deflected, leaving both the cow and the sprinkler head undamaged. My sprinkler head outer body is most preferably made sufficiently strong by way of material strength, thickness and shape to survive a direct non-deflected kick from a large cow with the sprinkler body being undamaged, or at least not being damaged to the point of the sprinkler being inoperable.

The bottom of the body includes an opening with threading to allow attachment thereof to a threaded liquid supply riser positioned near the wash pen floor. Inside the body is an inexpensive protective liner cup protecting the relatively expensive body from wear. The liner cup contains an upper and lower cam unit cooperatively structured to function as a drive motor to intermittently engage, in a impacting or vibratory manner, a rotatable centrally positioned pop-up nozzle. The drive motor is powered by water moving through the sprinkler, and functions with swirling movement of water passing through the sprinkler to cause intermittent rotation in the nozzle. During operation, the nozzle is pushed upward, by water pressure alone, through a close-fit opening or bore in a removable top cap of the body. The removable top cap, also having smooth rounded corners and being absent any exterior flanges, allows for the convenient servicing or replacement of the parts within the body, while at the same time closing the body to the entrance of dirt, manure, etc., during operating and non-operating modes. The nozzle is also generally rounded and smooth, being angled or sloped at the exposed upper tip to deflect kicks. The nozzle is arranged to be able to be temporarily pressed downward and fully back into the body during operation, such as by debris or a cow's hoof, to further reduce tripping, injuries, and damage, and to provide a self-cleaning action wherein the tight opening of the top cap through which the nozzle passes helps to break-up and wipe debris free as the nozzle moves downward. The flush or recess (non-extending) fitted nozzle orifices are positioned to allow the spray of the orifices to clean themselves and the immediate area of the top cap when the nozzle is held down by debris. The self-cleaning action of the nozzle and flush-mounted orifices is enhanced by the intermittent upward and rotational impacting or vibration of the drive motor, and by the position of the spray orifices in the angled wall of the nozzle tip relative to the top cap when the nozzle is in the depressed state. When debris (manure or dirt) falls on the smooth surfaced top of the cap and nozzle, the nozzle may be depressed downward wherein the spray orifices are positioned such that the continuing spray will undermine manure or dirt resting on the top cap, and thus normally spray the debris away within a short time to allow the nozzle to again rise and begin to rotate. The orifices also flush or wash debris from the opening of the cap around the nozzle, as the angled surface of the nozzle in which the orifices are placed allows the water to swirl around the depressed nozzle tip and to move upward following the angle of the nozzle tip to flush debris up and away from the nozzle tip and surrounding hole in the top cap. During the time that the nozzle is depressed by the debris resting thereon, the water moving through the sprinkler head continues to attempt to raise the nozzle through the debris as the debris is being flushed away. With all of these action combined, it will be very rare that debris falling on smooth top of the sprinkler head will hinder the proper operation thereof for more than a few moments prior to the head clearly itself and returning to normal operation.

The spray orifices in the nozzle are of a multi-diameter structure to break-up the water into large individual droplets so that the spray is more gentle or painless on the udder of a cow, splashes less of a distance, while at the same time being more effective at cleaning with a reduced volume of water.

The body, nozzle and drive motor are rendered highly durable by maintaining a separation between metal parts using self-lubricating plastics parts between each of the metal parts of the sprinkler. Furthermore, components which are known to be subjected to a high degree of wear compared to other components of my sprinkler are made durable, but are also structured to allow for the quick and inexpensive replacement thereof with new identical parts, and therefore my sprinkler will provide years of dependable operation in a dairy wash pen environment with very little expense after the initial purchase.

Therefore, an object of the invention is to provide a highly durable and economical sprinkler head for use in commercial dairy wash pens.

A further object is to provide the durable sprinkler head which is highly dependable in operation, having a debris excluding and self-cleaning action associated with the nozzle and orifices.

A further object is to provide the durable and dependable sprinkler head in a smooth outer shape which is non-injurious to cows, is less apt to be damaged when kicked by a cow, and aids in the self-cleaning action of the nozzle and orifices.

A further object is to provide the durable, dependable and non-injurious sprinkler head structured to deliver a continuous spray which is generally painless to a cow's udder, less likely to splash upward into the cow's face, and provides improved udder cleaning with less water used.

An even further object is to provide the durable, dependable, and non-injurious gentle spray sprinkler head structured to allow convenient and inexpensive replacement of components thereof when they do eventually become so worn as to render the sprinkler head inoperable, and to also protect relatively expensive components thereof from being worn by less expensive more readily replaced components.

These, as well as other objects of the present invention, will become more appreciated with continued reading coupled with a review of the appended drawings.

DESCRIPTION OF THE PREFERRED EMBODIMENT

Figure 4:
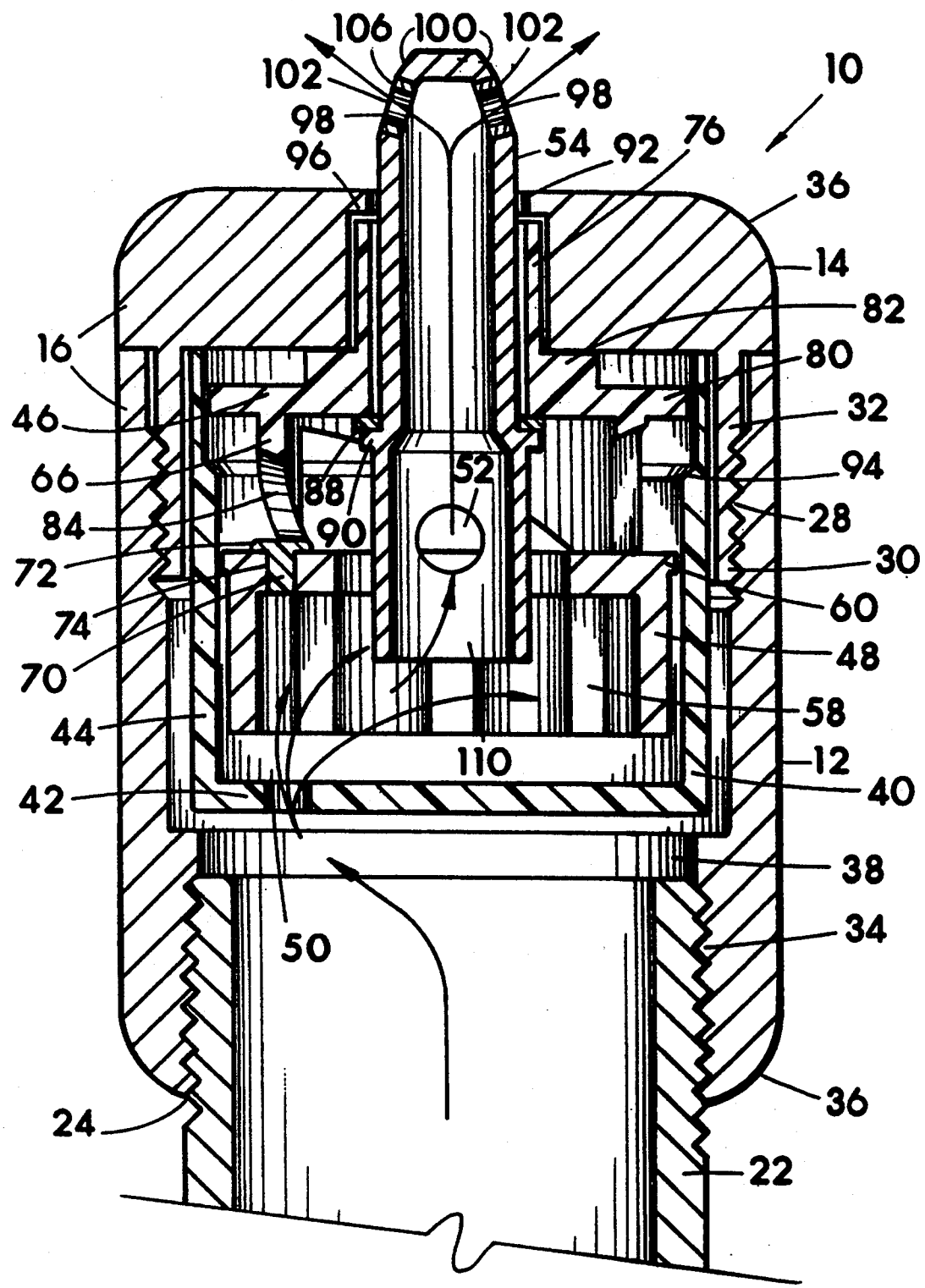
FIG. 4 is a cross-sectional side view of the embodiment of FIG. 1 assembled and in an operating mode.

Referring now to the drawing figures in general for a detailed description of a preferred structural embodiment of the present invention. It should be noted that some modifications to structure herein detailed and shown in the drawings to exemplify the invention which I consider to fall within the true scope of my invention are anticipated, and will be apparent to those skilled in the art after reading this disclosure. However, for the sake of briefness, all possible modifications to that herein detailed which fall within the true scope of the invention will not be specifically described. The present invention is an improved rotary sprinkler head 10 structured for use in an udder wash pen of a dairy. Sprinkler head 10 includes a lower outer body portion 12 having a removable top cap 14. Body portion 12 and top cap 14 together are considered to define the body 16 of the sprinkler head 10, and define a split or openable outer body to allow access to components therein for servicing. Body portion 12 and top cap 14 each preferably include a single indentation 18 having a bottom therein to allow grasping of the component with a spanner wrench for tightening purposes, such as during installation. The exterior of body portion 12 may additionally include a narrow circumferal strip or two of shallow knurling 20 for grasping by the hand when initially installing the body portion 12 onto a pipe 22 prior to using a spanner wrench to completely tighten. The narrow bands of shallow knurling 20 have not been found to significantly reduce the cow hoof deflecting aspect of the otherwise hard, smooth and slick outer surface of body portion 12. Body portion 12 is a hollow elongated cylindrically shaped barrel with an opening 24 at the bottom thereof, and oppositely disposed therefrom an opening 26 at the upper end of the body portion 12. The upper opening 26 is defined by material of body portion 12 which includes threads 28. Threads 28 at the upper end of body portion 12 are for threadably engaging an extending annular wall having exterior threads 30 designated male threaded portion 32 and depending from what is considered the bottom of top cap 14 for the purposes of removably retaining top cap 14 on body portion 12. Threads 30 of top cap 14 and the mating threads 28 at the upper end of body portion 12 are preferably straight-cut or non-tapering threads for reasons to be explained hereinafter. Opening 24 at the bottom end of body portion 12 also includes threads 34 therearound to allow attachment of body portion 12 and thus sprinkler head 10 to the threaded end of a liquid supply line or pipe 22. Threads 34 of body portion 12 are tapered to seat fluid tight against the commonly tapered threads of a liquid supply pipe 22. Pipe 22 is normally a short vertically oriented pipe or nipple usually referred to as a riser, and so normally sprinkler head 10 is positioned lengthwise vertically oriented in use as may be ascertained from FIG. 4 wherein top cap 14 is the upper most portion of the head 10. The liquid supply pipe 22 will both mechanically support the sprinkler head 10 and deliver water or washing solution under pressure thereto. The water or washing solution will henceforth be referred to a "liquid" since it could be a mixture of water including surfactants and disinfectants. The exterior of body 16 is generally cylindrical, and includes smooth curved corners 36 at the bottom end and at the top end, with the rounded corners 36 at the top end being defined by the rounded corners of top cap 14 at what is considered the top of the top cap 14.

Figure 3:
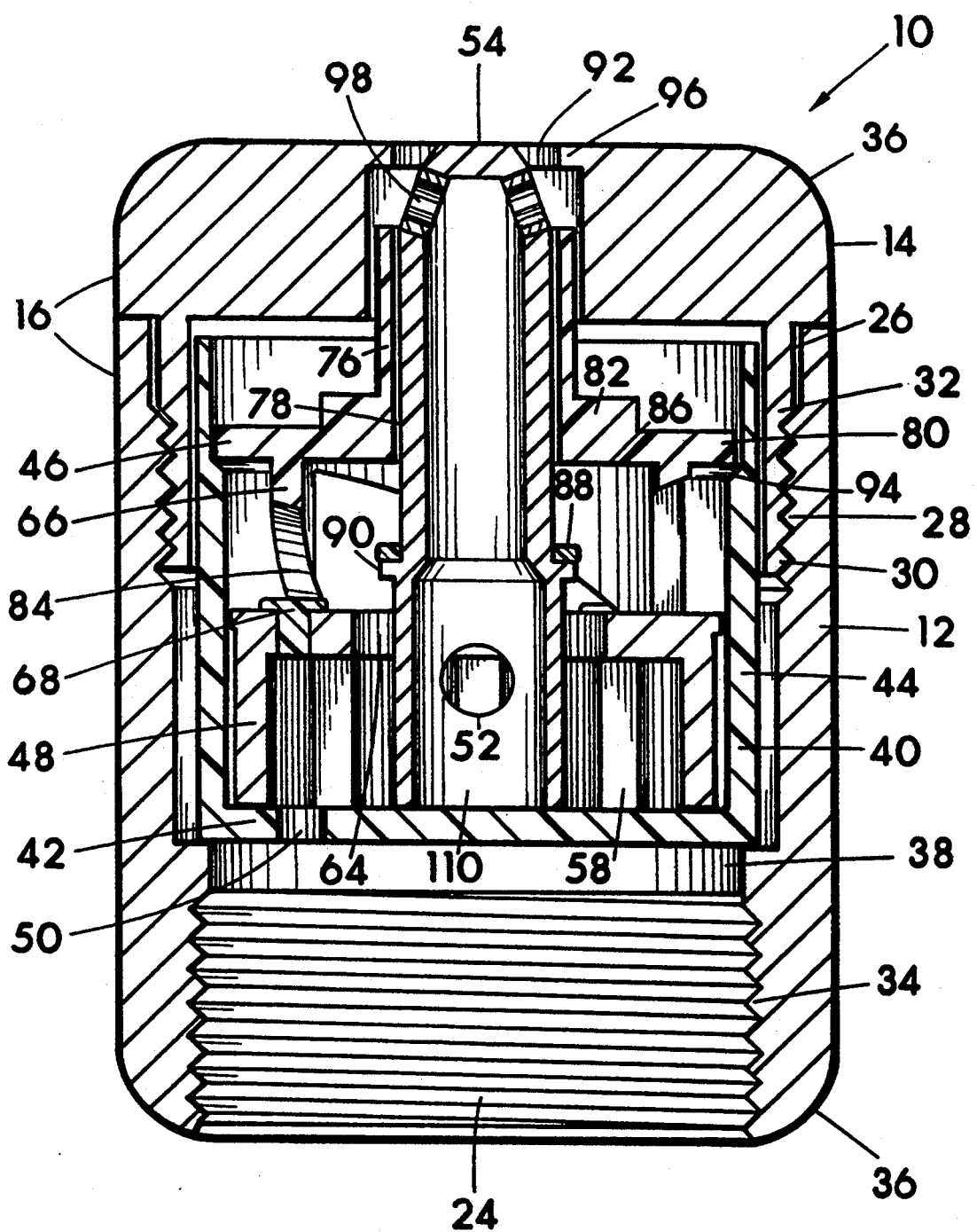
FIG. 3 is a cross-sectional side view of the embodiment of FIG. 1 assembled and in a non-operating mode.

Body portion 12 and top cap 14 defining body 16 are each preferably made of strong, thick, rigid metal which is corrosion resistant or treated to be corrosion resistant. Aluminum or brass may be the material defining body 16, and may be shaped by machining, casting, or any other suitable process. Other suitably strong metals such as stainless steel, or conceivably even very tough plastics such as fiberglass filled plastics could also be used to structure body 16. I am currently manufacturing body 16 out of machined 6061-T6 aluminum with very good results. The strong body 16 having a rounded, smooth exterior surface reduces tripping and injuries to cows. The smooth and cylindrically shaped body 16 being absent extending flanges and sharp corners causes most if not all kicks delivered thereto by a cow to be deflected, reducing the impact thereto, and normally leaving both the cow and the sprinkler head 10 undamaged. The strong, heavy walled nature of the body 16 is most preferably sufficiently strong to receive a direct non-deflected kick from a cow without breaking or otherwise being significantly damaged (deformed). In FIG. 3 it can be seen that the exterior diameter of top cap 14 is about the same as the exterior diameter of body portion 12, and this provides a closed-ended cylindrical body 16 of generally one exterior diameter when head 10 is attached to a liquid supply pipe 22.

Inside body portion 12 toward the bottom end thereof, positioned just above the upper terminal end of threads 34 is a ledge 38. The exterior and interior of body portion 12, or at least the sidewall thereof is annular, as is ledge 38. Ledge 38 provides a shelf or abutment surface on which rests the removable protective liner cup 40. Cup 40 is an inexpensive protective liner equal in length to about the measurement from ledge 38 upward to the top upper terminal edge of body portion 12 in this example of the invention.

Threads 28 at the upper end of body portion 12 are sufficiently outward, as is the male threaded portion 32, which is an annular depending wall and hollow centrally of top cap 14, to engage threads 28 outward beyond the exterior of cup 40 as may be seen in the drawings where cup 40 is shown inward of the annular wall defining male threaded portion 32. The underside of top cap 14 prevents liner cup 40 from being pushed upward by liquid pressure during operation. Liner cup 40 includes a horizontal bottom plate 42 connected to a vertically rising annular wall 44 having an exterior diameter slightly smaller than the internal hollow diameter of body portion 12 so that cup 40 may be removably inserted into body portion 12 and rest therein with plate 42 on ledge 38. Liner cup 40 serves to protect, being a liner, the interior side wall and bottom ledge 38 of the relatively expensive body portion 12 from being worn by upper and lower cams 46, 48 of the drive motor. Liner cup 40 is preferably made of plastics, and preferably hard rigid plastics which are of a lubricating nature to provide a low coefficient of friction against drive motor cams, and to be adequately durable and inexpensive. "Delrin" by Du Pont Co. is a tradename for an acetal resin which may, and preferably includes lubricating additives to make the plastic slick. Cup 40 may be manufactured inexpensively out of "Delrin" by injection molding or machining. "Delrin" is the material which I currently utilize because of its rigidity and durability, and this with good success, however many other plastics are available today which may be feasibly substituted for "Delrin" (acetal resin thermoplastic). In the remainder of this disclosure, other plastics components of sprinkler head 10 will be detailed, and all of these plastics parts may be feasibly manufactured out of "Delrin" or other suitably durable plastics.

Figure 2:
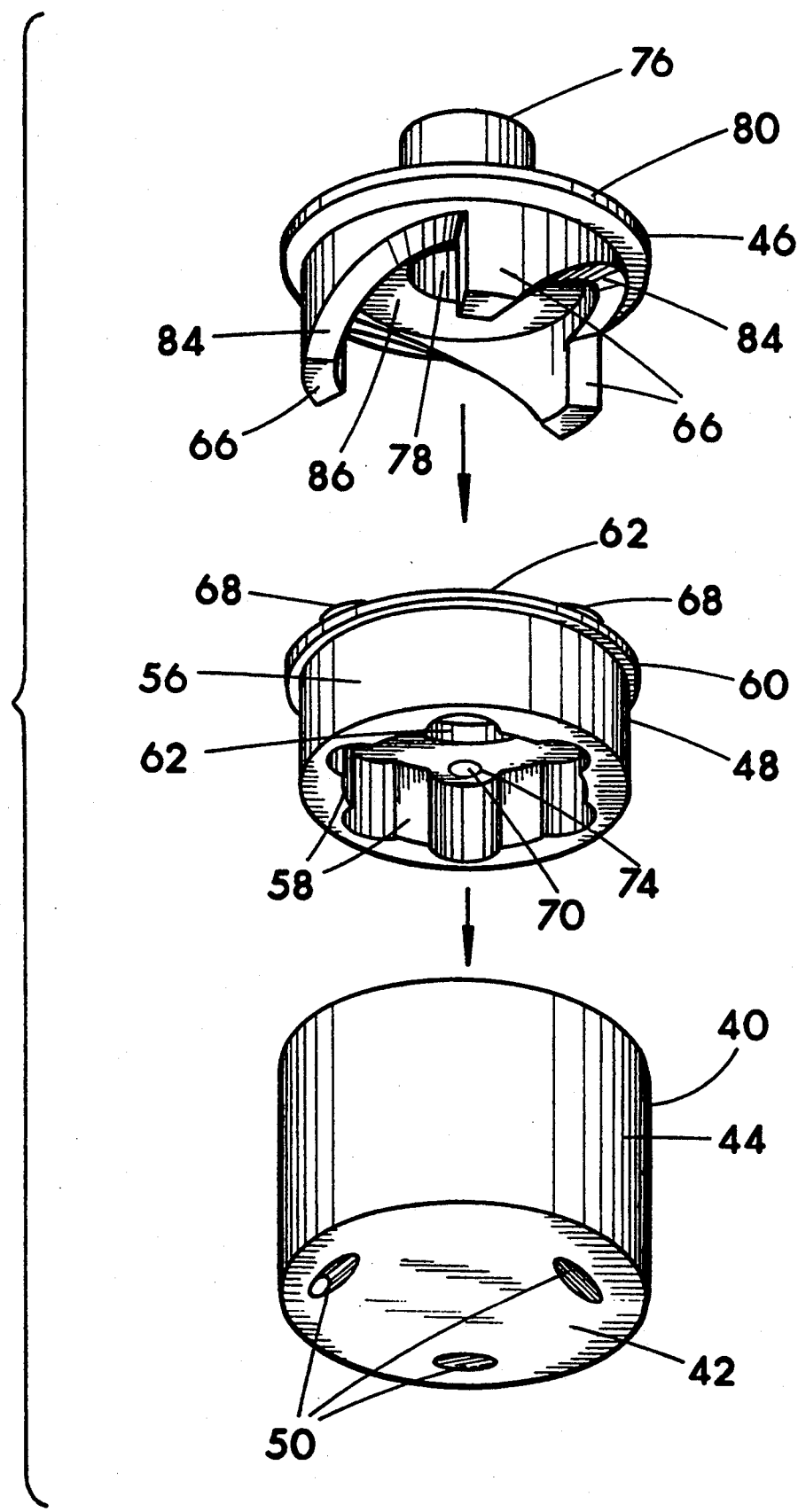
FIG. 2 being an exploded view, shows the upper cam positioned above the lower cam of the nozzle drive motor which in turn is shown positioned above the protective liner cup which fits into the interior of the body.

Bottom plate 42 of liner cup 40 includes at least one aperture 50 therethrough, and preferably as shown in FIG. 2, three evenly spaced apertures 50 through plate 42, each aperture positioned outward of the center of the plate 42, which provides improved liquid swirling. Apertures 50 pass through plate 42 at a slope or angle so that liquid received from pipe 22 passes through the apertures 50 and is directed into the open interior of cup 40 in an angular direction toward the cup wall to create swirling in the liquid filling the cup substantially as detailed in the incorporated patent. However, plate 42 does not include a central opening as utilized in the structure of the incorporated patent to lift the nozzle. All of the liquid entering cup 40 enters through angled apertures 50 thereby resulting in increased swirling. In the structural example herein described of the present invention, in order to initially raise nozzle 54 off of plate 42, an opening 52 in the sidewall of the lower end of the nozzle is provided adjacent the bottom end of nozzle 54, and this will hereinafter be further described.

Movably positioned within liner cup 40 is the drive motor generally comprising lower cam 48, the bottom of which is positioned against the upper or interior side of plate 42, and an upper cam 46, the bottom of which is positioned above or on top of the top of lower cam 48. Both cams 46 and 48 are separated from body portion 12 by liner cup 40. Also positioned centrally within sprinkler head 10 is the hollow tubular or cylindrically shaped nozzle 54 positioned lengthwise vertically oriented with the lower liquid receiving end of the nozzle 54 extending through a central opening in both the upper and lower cams 46, 48, and resting on the upper side of plate 42 as may be ascertained from FIG. 3 where sprinkler head 10 is shown cross sectioned and in a non-operating mode. The upper end of nozzle 54 extends through a central opening or bore in top cap 14 and will be described further.

Essentially as described in the incorporated patent, the present lower cam 48 is defined by a vertically oriented annular wall 56 having a smooth exterior surface and an interior surface having vertically oriented grooves and vanes 58 to be caught by the swirling liquid. The exterior top end of lower cam 48 preferably includes a thin outward extending annular rim 60 which provides a narrow and thus low coefficient of friction bearing and lateral stabilizing surface to abut the smooth interior surface of the annular wall of cup 40 during operation, when the lower cam 48 rises and falls while rapidly spinning due to the swirling liquid. The top terminal end of lower cam 48 includes an inwardly depending annular flange 62 which effectively widens the top surface of lower cam 48 and defines the opening 64 through which the lower end of nozzle 54 passes. Opening 64 of lower cam 48 is larger than the exterior diameter of nozzle 54 to provide clearance between the two, and to prevent any significant pressure differential in liquid from developing between the upper and lower surfaces of flange 62 of lower cam 48. The rise of the nozzle 54 causes the rise in upper cam 46, and to cause the cam 46 to stay in the raised position during operation, and thus upper cam 46 is made of lightweight plastics for the purposes of weight, costs of manufacturing, as well as durability. Flange 62 overhangs the interior major diameter of lower cam 48 with the overhang providing a surface for liquid to press upward against and push the lower cam 48 upward during operation. Spacing is provided for both upper and lower cams 46 and 48 to move up and down vertically within the interior of body 16. The exterior major diameters of cams 46 and 48 relative to the interior diameter of cup 40 are such that lateral stability is provided as the cams move up and down, and spin during operation. Lower cam 48 is made of a durable rigid metal, preferably corrosion resistant, and it has been found that brass being relatively heavy compared to aluminum or plastics, works better for the material from which to make lower cam 48, and this is because when operating the sprinkler head 10 with relative high pressure and volume, the proper weight of lower cam 48 will prevent the cam 48 from being pushed upward and simply remaining upward against the bottom of upper cam 46. Upper cam 46 is pushed upward and remains upward during operation, but lower cam 48 moves up and down in a cyclical manner during operation to thus engage and then disengage upper cam 46. It is desirable that lower cam 48 move upward with liquid pressure, but that it is of a weight relative to the liquid flow and pressure among other factors such as slopes on upper cam 46, that the lower cam 48 is able to fall downward after rising upward. The upper surface of flange 62 and bumpers 68 provide an abutment surface for the legs 66 of the upper cam 46 as will be detailed. The upper surface of flange 62 also provides a surface on which to removably (replaceably) attach upwardly extending buttons or bumpers 68.

Figure 1:
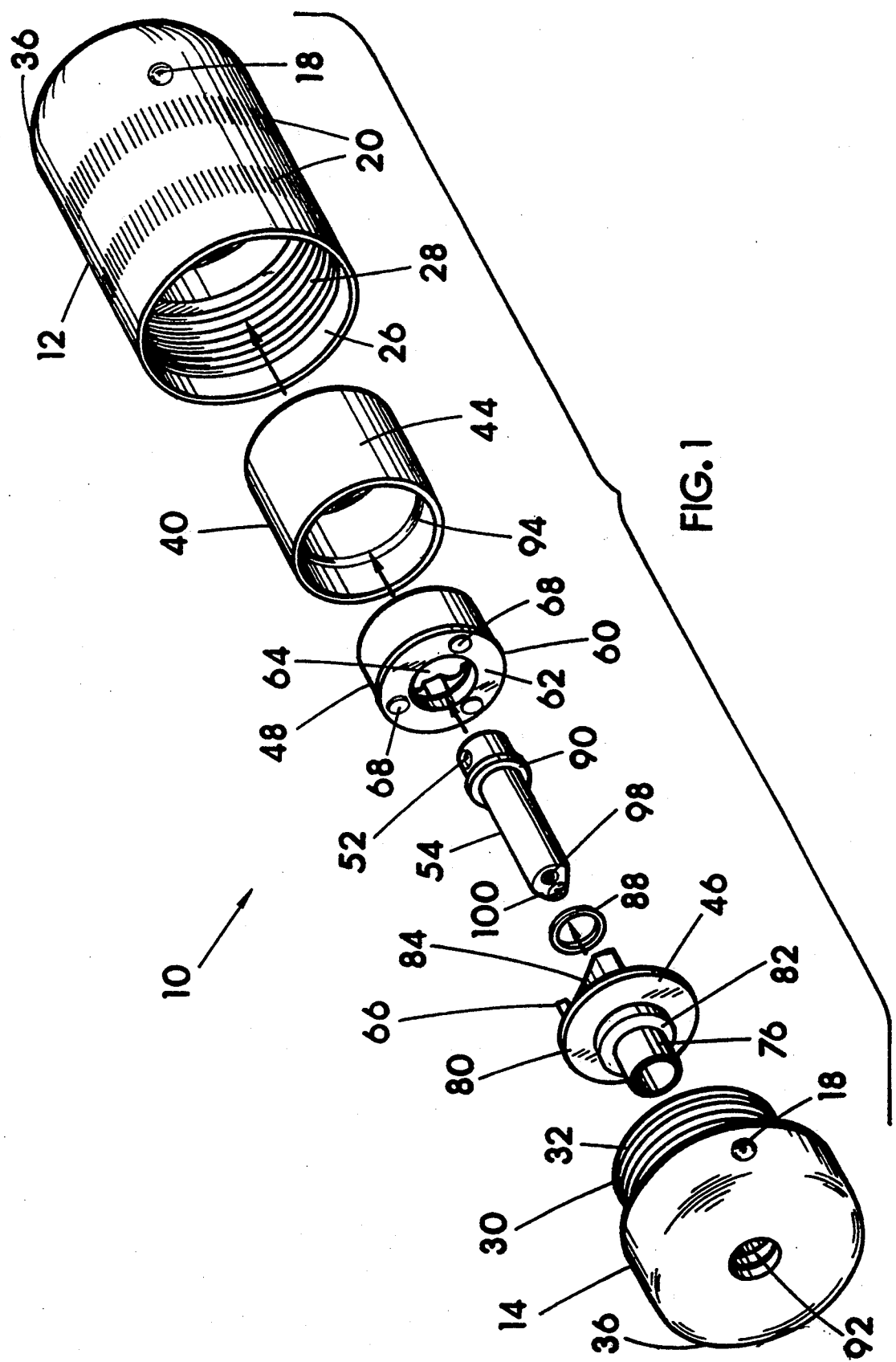
FIG. 1 is an exploded view of a preferred structural embodiment of my improved sprinkler head.

Bumpers 68 are short circular extensions on the top surface of lower cam 48 which are preferably made of plastics for reasons of durability, expense, and ease of replacement. As best shown in FIG. 3, bumpers 68 are shaped to include a cylindrical post-like base 70 and an attached widened circular plate head 72 which is exposed on the upper surface of flange 62. The post-like base 70 is inserted into a vertical bore 74 in flange 62 where frictional adhesion with a tight fit retains the bumper 68 in place. In FIG. 1 it can be seen that three bumpers 68, equally spaced around the top surface of flange 62 are used in the example of the invention herein described. The three bumpers 68 are equal in number to the three equally spaced downward extending legs 66 of upper cam 46. During operation, bumpers 68 continuously engaged and disengage the legs 66, and thus bumpers 68 are subject to wear, and so it is desirable to make bumpers 68 durable yet inexpensive, but also readily replaceable on the more expensive brass body of lower cam 48.

The brass body of lower cam 48 will last significantly longer than bumpers 68 if the bumpers were to be made of brass also, or in other words, if the entire structure of lower cam 48 were to be made of brass, body and bumpers alike, the bumpers would be wornout long before the balance of lower cam 48, and thus the reason for structuring bumpers 68 in a readily replaceable fashion can be appreciated. When the bumpers 68 are significantly worn, reduced in the upward extension thereof and deformed, they can simply be pulled or pushed from the retaining bores 74 and new bumpers 68 inserted therein.

Upper cam 46 shown best by itself in FIG. 1 and 2, generally comprises a vertically oriented central barrel 76 affixed over a central opening 78 in a circular disk 80 positioned horizontally. Barrel 76 is considered to be positioned on the top of disk 80. Also on the top of disk 80 encircling barrel 76 is a circular low friction bearing plate 82. On the bottom side of disk 80 are the three legs 66. Each leg 66 includes a sloped or angled side 84 positioned to be abutted by a bumper 68 during operation of the sprinkler head when the lower cam 48 rises and is spinning in a clockwise direction. The direction of rotation of lower cam is the result of the particular angle of apertures 50 and the resultant spinning direction of the swirling liquid, and could be manufactured to spin in the opposite direction in which case the sloped surfaces on legs 66 would need to be applied to the opposite sides of the legs 66 from that shown in FIG. 2. The sloped surface 84 of the legs 66 serves as an abutment surface against which the bumpers 68 of lower cam 48 abut, wherein the abutment from bumpers 68 causes rotation in the upper cam 46. The bumpers 68 slide along the downward sloped surface of the legs 66, the bumper 68 and lower cam 48 follow the slope until they move sufficiently downward toward the bottom end of head 10 and plate 42 as to disengage legs 66 momentarily, followed by the spinning lower cam 48 being again pushed upward by the swirling liquid to again abut legs 66 and rotate the upper cam 46. During this abutting of the bumpers 68 against the legs 66, the upper cam 46 is fully raised with the laterally stabilizing and low friction bearing surface 82 abutted against the underside of top cap 14. The rotation in the upper cam 46 equates to rotation in nozzle 54 via a frictional connection between the upper cam 46 and nozzle 54 as will be detailed. Positioned between the three legs 66 is a surface 86 encircling the central opening through upper cam 46. This surface 86 is the surface against which a rubbery friction causing washer 88 abuts during operation. Washer 88 has a high coefficient of friction, and serves a frictional connection or tie between nozzle 54 and upper cam 46 so that rotation in upper cam 46 results in rotation in nozzle 54. The friction washer 88 rests on flange 90 of nozzle 54 and is durable, readily replaceable, and very inexpensive.

Top cap 14 includes a central opening or bore 92 sized to receive barrel 76 and allow the barrel 76 and thus the entire upper cam 46 to rotate and move vertically up and down. During non-operating mode, upper cam 46 will move downward absent any liquid pressure to retain it upward. When upper cam 46 moves downward, it is limited in its downward movement by an interior ledge 94 toward the top of liner cup 40, and thus the upper portion of barrel 76 remains in the bore or opening 92. Barrel 76 serves as a low friction lateral stabilizing member around nozzle 54. The upper most portion of bore 92 in cap 14 includes an annular inward overhanging flange 96 defining an opening only slightly larger than the exterior diameter of nozzle 54, and thus provides a seal around the nozzle to exclude large pieces of debris during operation. Opening or bore 92 thus has two diameters, one being slightly larger than the exterior diameter of barrel 76 and below flange 96, and the other defined by overhanging flange 96 being slightly larger than the exterior diameter of nozzle 54. The barrel 76 does not abut the underside of flange 96. The internal diameter of barrel 76 is slightly larger than the exterior diameter of nozzle 54 and about equal to the opening defined by flange 96. Nozzle 54 is able to move upward and downward through the center of barrel 76 and the smaller upper portion of opening 92 defined by flange 96.

Nozzle 54 being an elongated tubular or hollow structure is open at the terminal bottom end at opening 110 where the majority of liquid enters the nozzle 54 during operation. On the lower sidewall of nozzle 54 is the side opening 52 positioned within the encircling lower cam 48 when liquid is first introduced into the sprinkler head. Side opening 52 receives the liquid, and nozzle 54 rises to open the main bottom opening 110 to the entrance of liquid for continued operation. Positioned about one-third up the length from the bottom of nozzle 54 is the outwardly extending annular flange 90 on which rests friction washer 88. Nozzle 54 is preferably made of a corrosion resistant rigid metal, such as brass for example, as brass is sufficiently heavy to cause the nozzle to fully retract under its own weight back into body 16 when the sprinkler is shut-off. Other suitable materials could be used from which to make nozzle 54. Nozzle 54, as shown in FIG. 3 is preferably of a length relative to the length of body 16 and the position of plate 42 of cup 40 so that when retracted, the nozzle will be fully within body 16, with this being to prevent a cow from stepping on the top of the nozzle and pressing it through plate 42.

Figure 5:
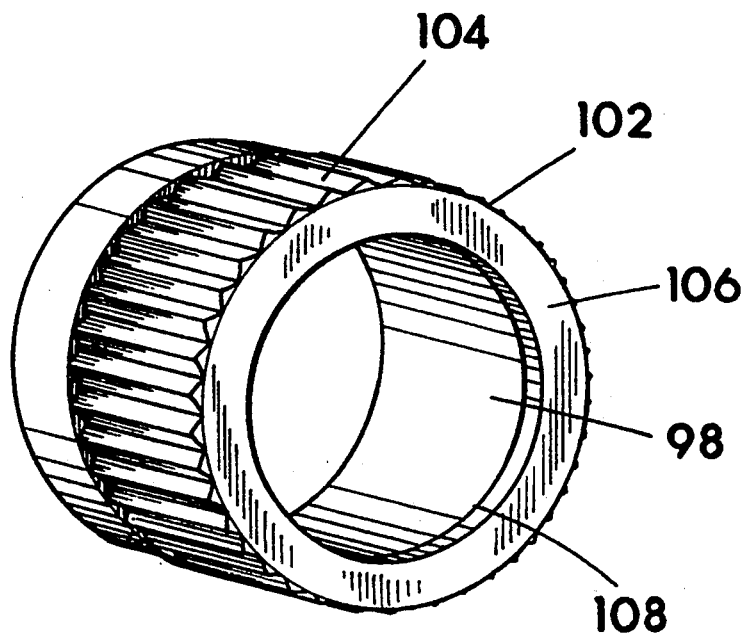
FIG. 5 is a rear perspective view of a nozzle insert which defines an orifice having multiple diameters to produce a preferred liquid spray.
Figure 6:
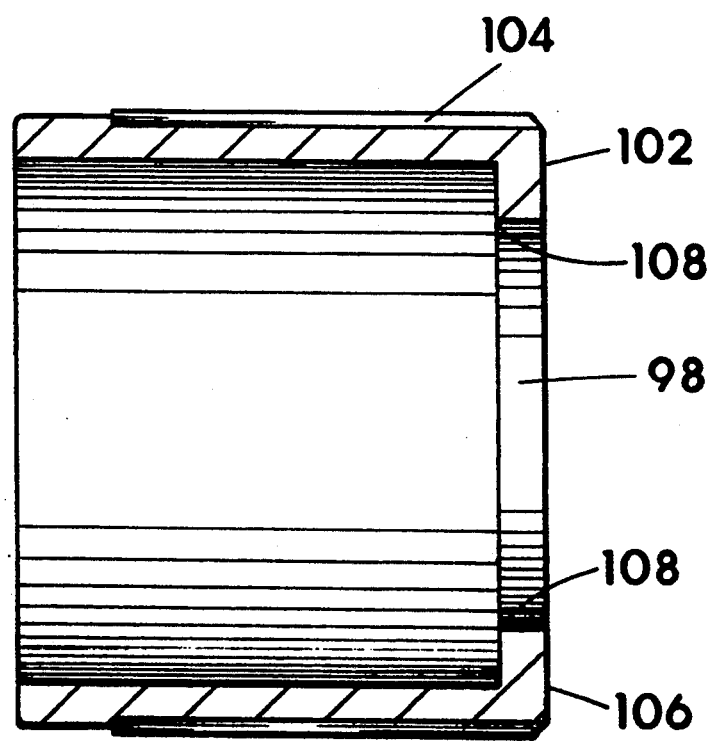
FIG. 6 is a cross-sectional side view of the insert of FIG. 5.

Nozzle 54 includes two oppositely disposed liquid outlet or spray orifices 98. Orifices 98 are positioned in an angled sidewall portion 100 adjacent the upper terminal end of nozzle 54. The upper terminal end of nozzle 54 is closed. From flange 90 upward to the beginning of angled sidewall portion 100, the exterior diameter of nozzle 54 is a single diameter so the nozzle 54 may slide up and down through barrel 76 and the opening in top cap 14. Nozzle 54 during operation will spin in one direction, and in a 360 degree circle. The orifices 98 being oppositely disposed from one another, and each sized to output an equal volume of liquid will tend to maintain the nozzle centrally positioned or laterally stabilized within opening 92, and away of flange 96 or at least not pressing hard thereagainst during operation. Orifices 98 in this example of the invention are positioned in an angled sidewall portion 100 aiming upward at about 21 degrees from horizontal. Inserts 102 as shown in FIGS. 5 and 6 define the orifices 98. Inserts 102 are each pressed into a larger bore through the nozzle angled sidewall portion 100 where the inserts 102 are frictionally retained with the assistance of knurling 104 on the outside thereof and the close-fit nature of the arrangement (pressed-in). Each insert 102 is identical to the other insert 102. In order to have orifices 98 output a spray which is non-painful to the cow's udder, and which is less likely to splash upward into the cow's face, and which is highly effective at washing with relatively low volumes of liquid as hereinabove described, I have found that structuring the internal bore defining the orifice 98 to include two quickly changed and sharply distinct diameters will render a spray which meets these goals. In FIGS. 5 and 6, 106 represents the front or exposed end of insert 102. The front end 106 includes a substantially smaller diameter opening than the diameter of the opening through the insert 102 which in use is positioned more toward the center of nozzle 54. This diameter reduction of the opening at or adjacent the front or exposed end 106 of the insert 102 is defined by a sharp or rapid diameter change at 108. This sharp diameter change has been found to cause liquid passing through the orifice 98 to leave the front end 106 of the insert 102 as very close together and rapidly moving large individual drops or droplets. These droplets although appearing to the eye to be defining a tight high impact jet or stream of liquid, define a tightly grouped stream of individual drops which splatter as individual drops having the impact of individual drops against the cow's udder, with the effect thereof being far more gentle to the udder, and far less likely to splash and travel sufficiently upward off of the cow's front legs to reach his face. The impacting or splattering individual large droplets have also been found to produce improved cleaning per given gallon of liquid as opposed to a solid stream which is not composed of large individual droplets. I have tried merely tapering the bore through inserts 102 as opposed to the sharp diametrical transition, and have not had as good of results with this tapering. In FIG. 3, as hereinabove detailed, it can be seen that orifices 98 are in a position when nozzle 54 is depressed, assuming for the moment the nozzle 54 in FIG. 3 is fully depressed by debris and spraying liquid, that the liquid from the orifices 98, positioned below the stationary exterior top of cap 14, would have a tendency to move upward around the angled sidewall of the tip of nozzle 54 and to flush or wash debris upward and away from opening 92 in top cap 14 and nozzle 54.

To assemble all of the components, cup 40 is first inserted into body portion 12 with the open end of the cup 40 facing upward and plate 42 resting on ledge 38. Lower cam 48 is then inserted into cup 40 with bumpers 68 facing upward. Upper cam 46 is then inserted over the top end of nozzle 54 so as to bring surface 86 to rest upon friction washer 88 which has previously been applied over the nozzle to rest on flange 90. The nozzle 54 and upper cam 46 may then be inserted into cup 40, legs 66 and the bottom end of nozzle 54 first. The nozzle 54 will move downward until the bottom end thereof rests on the upper or interior side of plate 42. The outer peripheral edge of disk 80 of upper cam 46 will come to rest on ledge 94 of cup 40. Top cap 14 may now be threadably engaged onto body portion 12 and rotated clockwise until tightened. The use of right hand threads on cap 14 when upper cam 46 rotates clockwise during operation allows the rotating upper cam 46 to re-tighten cap 14 should a cow kick the cap 14 in a manner to cause it to loosen. As mentioned hereinabove, upper cam 46 rotates clockwise during operation, and so cap 14 if not fully tightened, will be tightened during operation by the bearing surface 82 of cam 46 spinning and abutting the underside of the cap 14. When top cap 14 is fully installed, and the sprinkler is not operating as shown in FIG. 3, barrel 76 is partially inserted into the bore of cap 14, and nozzle 54 is being laterally stabilized by the barrel 76.

The operation of sprinkler head 10 is essentially as follows. Liquid from a liquid supply pipe 22 enters the interior of cup 40 in a swirling manner via apertures 50. Liquid moves through opening 52 in the lower end of nozzle 54 wherein due to flow restriction created by the size of orifices 98 at the top end of nozzle 54, pressure builds and nozzle 54 rises, and due to the engagement at friction washer 88, upper cam 46 is moved upward until bearing surface 82 abuts the underside of top cap 14 and further upward travel of both nozzle 54 and upper cam 46 is prevented. Liquid begins to enter nozzle 54 via bottom opening 110. The swirling liquid causes lower cam 48 to spin and to rise sufficiently to abut legs 66 and cause rotation in upper cam 46 and nozzle 54, then the sloped surfaces 84 of legs 66 throw lower cam 48 downward for a brief instant and the cycle is repeated. During operation, the two oppositely disposed orifices 98 are outputting streams of liquid, and the nozzle 54 spins in what appears to the eye to be a steady rotation of 360 degrees. It should be noted that if it is undesirable to have the spray shooting in certain areas, blockers or mechanical spray blocks may be employed to block the spray from shooting into given areas.

Although I have very specifically described the preferred structures and use of a preferred embodiment of the invention, it should be understood that some changes in the specific structures described and shown in my drawings may be made without departing from the true scope of the invention in accordance with the appended claims.

What I claim as my invention is:

1. A sprinkler for washing udders of dairy animals, said sprinkler comprising, a generally hollow and rigid body, said body defined by a lower body portion and a top cap connected to said lower body portion by releasable connecting means allowing ready disconnecting and connecting of said cap and said lower body portion, said body being cylindrical in exterior shape and including a smooth radius at a top end and a smooth radius at bottom end thereof, the radius at said bottom end fashioned into said lower body portion, the radius at said top end fashioned into said cap, said body further being absent exterior extending flanges and sharp corners so as to provide a smooth cylindrical exterior shape generally non-injurious to a dairy animal and resistant to damage from kicking;

liquid supply pipe connecting means in said lower body portion for connecting a liquid supply pipe for supplying pressurized liquid to said sprinkler;

a protective liner cup readily removably contained within said lower body portion, said cup having a bottom plate including at least one aperture passing angularly therethrough and positioned relative to said pipe connecting means to receive liquid from a liquid supply pipe and to direct the received liquid into an interior of said cup to produce swirling liquid within the cup interior;

a drive motor within the cup interior, said drive motor including a lower cam and an upper cam, said lower cam including means for spinning and rising vertically within said cup with swirling liquid within said cup, said lower cam including replaceably affixed bumpers positioned on an upper surface thereof for engaging legs of said upper cam for imparting rotational movement in said upper cam, means for disengaging said bumpers from said legs after engagement;

a nozzle, said nozzle being an elongated tubular member having a first liquid intake opening in a sidewall adjacent a bottom end thereof, and a second liquid intake opening in said bottom end of said nozzle, said nozzle further including a flange supporting a frictional washer, said nozzle positioned centrally within said body with said nozzle positioned in part within a central opening in each of said upper and lower cams, said frictional washer positioned for abutment with an underside of said upper cam during operation of said sprinkler so as to provide a frictional link between said nozzle and said upper cam rendering rotational movement in said nozzle upon rotational movement in said upper cam, said nozzle further including at least one liquid outlet orifice positioned in an angled sidewall portion of an upper end of said nozzle, said orifice including at least two distinct diameters;

an opening through said cap positioned relative to the nozzle upper end so as to allow the nozzle upper end and said orifice to rise during operation with liquid pressure to above a top surface of said cap and to spray liquid outward from said sprinkler;

said nozzle being of a length relative to said body and said plate of said cup so as to allow substantially all of said nozzle to reside within said body with said sprinkler in a non-operating mode.

2. A sprinkler for washing udders of dairy animals according to claim 1 wherein said body is manufactured of a strong rigid metal.

3. A sprinkler for washing udders of dairy animals according to claim 2 wherein said protective liner cup is manufactured of a rigid plastics material and positioned within said body so as to substantially protect said body from wear by said drive motor; said cup being removable for replacement thereof via removing of said cap from said lower body portion.

4. A sprinkler for washing udders of dairy animals according to claim 3 wherein said lower cam is manufactured of metal and said replaceably affixed bumpers are manufactured of plastics material.

5. A sprinkler for washing udders of dairy animals according to claim 4 wherein said bumpers each include a head connected to a base, the base of each bumper frictionally engaged in a bore in said lower cam.

6. A sprinkler for washing udders of dairy animals according to claim 4 wherein said upper cam is manufactured of plastics material.

7. A sprinkler for washing udders of dairy animals according to claim 6 wherein said nozzle is manufactured of a rigid metal.

8. A sprinkler for washing udders of dairy animals according to claim 7 wherein said at least one orifice having two distinct diameters is defined by an insert affixed within a bore in said angled sidewall portion of said upper end of said nozzle.

9. A sprinkler for washing udders of dairy animals, said sprinkler comprising, a generally hollow and rigid body, said body defined by a lower body portion and a top cap connected to said lower body portion by releasable connecting means allowing ready disconnecting and connecting of said cap and said lower body portion, said body being cylindrical in exterior shape and including a smooth radius at a top end and a smooth radius at bottom end thereof, the radius at said bottom end fashioned into said lower body portion, the radius at said top end fashioned into said cap, said body further being absent exterior extending flanges and sharp corners so as to provide a smooth cylindrical exterior shape generally non-injurious to a dairy animal and resistant to damage from kicking;

liquid supply pipe connecting means in said lower body portion for connecting a liquid supply pipe for supplying pressurized liquid to said sprinkler;

a protective liner cup readily removably contained within said lower body portion, said cup having a bottom plate including at least one aperture passing angularly therethrough and positioned relative to said pipe connecting means to receive liquid from a liquid supply pipe and to direct the received liquid into an interior of said cup to produce swirling liquid within the cup interior;

a drive motor within the cup interior, said drive motor including a lower cam and an upper cam, said lower cam including means for spinning and rising vertically within said cup with swirling liquid within said cup, said lower cam including bumpers positioned on an upper surface thereof for engaging legs of said upper cam for imparting rotational movement in said upper cam, means for disengaging said bumpers from said legs after engagement;

a nozzle, said nozzle being an elongated tubular member having a liquid intake opening in a lower portion thereof positioned within said cup, said nozzle positioned centrally within said body with said nozzle positioned in part within a central opening in each of said upper and lower cams, said nozzle further including an engaging means for abutment with an underside of said upper cam during operation of said sprinkler so as to provide a connection between said nozzle and said upper cam rendering rotational movement in said nozzle upon rotational movement in said upper cam, said nozzle further including at least one liquid outlet orifice positioned in an angled sidewall portion of an upper end of said nozzle;

an opening through said cap positioned relative to the nozzle upper end so as to allow the nozzle upper end and said orifice to rise during operation with liquid pressure to above a top surface of said cap and to spray liquid outward from said sprinkler;

said nozzle being of a length relative to said body and said plate of said cup so as to allow substantially all of said nozzle to reside within said body with said sprinkler in a non-operating mode.

10. A sprinkler for washing udders of dairy animals, said sprinkler comprising, a generally hollow and rigid body, said body defined by a first body portion and a second body portion connected to said first body portion by releasable connecting means allowing ready disconnecting and connecting of said first and second body portions relative to each other, said body being cylindrical in exterior shape and absent exterior extending flanges and sharp corners so as to provide a smooth cylindrical exterior shape generally noninjurious to a dairy animal and resistant to damage from kicking;

liquid supply pipe connecting means in said first body portion for connecting a liquid supply pipe for supplying pressurized liquid to said sprinkler;

plate means contained within said first body portion and including at least one aperture passing angularly therethrough and positioned relative to said pipe connecting means to receive liquid from a liquid supply pipe and to direct the received liquid into an interior of said body to produce swirling liquid within the body interior;

a drive motor within the body interior, said drive motor including a lower cam and an upper cam, said lower cam including means for spinning and rising vertically with swirling liquid within said body, said lower cam including at least one bumper positioned on an upper surface thereof for engaging said upper cam for imparting rotational movement in said upper cam, means for disengaging said bumper from said upper cam after engagement;

a nozzle, said nozzle being an elongated tubular member having a liquid intake opening in a lower portion thereof positioned within said body, said nozzle positioned centrally within said body with said nozzle positioned in part within a central opening in each of said upper and lower cams, said nozzle further including connecting means for providing a connection between said nozzle and said upper cam rendering rotational movement in said nozzle upon rotational movement in said upper cam, said nozzle further including at least one liquid outlet orifice positioned in an upper end of said nozzle;

an opening through said second body portion positioned relative to the nozzle upper end so as to allow the nozzle upper end and said orifice to rise during operation with liquid pressure to above a top surface of said second body portion and to spray liquid outward from said sprinkler.

11. A sprinkler for washing udders of dairy animals according to claim 10 wherein said at least one liquid outlet orifice includes at least two distinct and adjacent diameters for producing a liquid discharge comprising a plurality of individual droplets.

* * * * *